(12) United States Patent
Gray et al.

(10) Patent No.: US 11,851,537 B2
(45) Date of Patent: Dec. 26, 2023

(54) METHODS FOR MAKING A PLASTICIZED POLYMER, METHODS FOR MAKING A COMPOSITION USING THE PLASTICIZED POLYMER, AND COMPOSITIONS COMPRISING THE PLASTICIZED POLYMER

(71) Applicant: BOSTIK, INC., Wauwatosa, WI (US)

(72) Inventors: Steven D. Gray, Mequon, WI (US); Kimberly E. Secrist, Wauwatosa, WI (US); Miao Hu, Pewaukee, WI (US)

(73) Assignee: Bostik, Inc., Wauwatosa, WI (US)

( * ) Notice: Subject to any disclaimer, the term of this patent is extended or adjusted under 35 U.S.C. 154(b) by 583 days.

(21) Appl. No.: 16/584,981

(22) Filed: Sep. 27, 2019

(65) Prior Publication Data

US 2020/0102428 A1 Apr. 2, 2020

Related U.S. Application Data

(60) Provisional application No. 62/737,954, filed on Sep. 28, 2018.

(51) Int. Cl.

| | |
|---|---|
| *C08J 3/22* | (2006.01) |
| *C09D 7/65* | (2018.01) |
| *C08L 91/00* | (2006.01) |
| *C09D 191/00* | (2006.01) |
| *C09J 11/08* | (2006.01) |
| *C09J 191/00* | (2006.01) |
| *C09K 3/10* | (2006.01) |
| *C10M 101/00* | (2006.01) |
| *C10M 107/04* | (2006.01) |
| *C10M 177/00* | (2006.01) |

(52) U.S. Cl.
CPC ............... *C08J 3/226* (2013.01); *C08L 91/00* (2013.01); *C09D 7/65* (2018.01); *C09D 191/00* (2013.01); *C09J 11/08* (2013.01); *C09J 191/00* (2013.01); *C09K 3/10* (2013.01); *C10M 101/00* (2013.01); *C10M 107/04* (2013.01); *C10M 177/00* (2013.01); *C08L 2310/00* (2013.01); *C09K 2200/062* (2013.01); *C10M 2203/003* (2013.01); *C10M 2205/0225* (2013.01)

(58) Field of Classification Search
CPC .......... C08J 3/226; C09D 7/65; C09D 191/00; C08L 91/00; C08L 2310/00; C09J 191/00; C09K 3/10; C09K 2200/062
USPC ........................................................ 427/207.1
See application file for complete search history.

(56) References Cited

U.S. PATENT DOCUMENTS

| | | | |
|---|---|---|---|
| 5,412,025 | A | 5/1995 | Fries |
| 5,853,642 | A | 12/1998 | Siedle et al. |
| 6,689,847 | B2 | 2/2004 | Mawson et al. |
| 10,011,744 | B2 | 7/2018 | Wang et al. |
| 2018/0208757 | A1 | 7/2018 | Jiang et al. |

FOREIGN PATENT DOCUMENTS

| | | |
|---|---|---|
| CN | 107602765 A | 1/2018 |
| EP | 3164458 A1 | 5/2017 |

OTHER PUBLICATIONS

International Search Report for PCT/US2019/053475 dated Feb. 7, 2020.
Written Opinion of International Searching Authority for PCT/US2019/053475 dated Feb. 7, 2020.

*Primary Examiner* — Edward J Cain
(74) *Attorney, Agent, or Firm* — Christopher R. Lewis

(57) ABSTRACT

A method for making a plasticized polymer comprises polymerizing a polymerizable monomer, such as an ethylenically unsaturated monomer, in a plasticizer, such as mineral oil, and in the presence of a catalyst system. The plasticized polymer may be mixed with a tackifying resin in a method for making an adhesive. A composition, which may be useful as an adhesive, comprises a polymer system comprising a first polymer; a plasticized system comprising a first plasticizer that was in the presence of the first polymer during the polymerization step to make the first polymer; and a tackifier. The method can be used to make compositions having polymers with a low density or a low molecular weight or both. The final compositions made by methods of the invention include adhesives, sealants, coating, or lubricants.

25 Claims, 2 Drawing Sheets

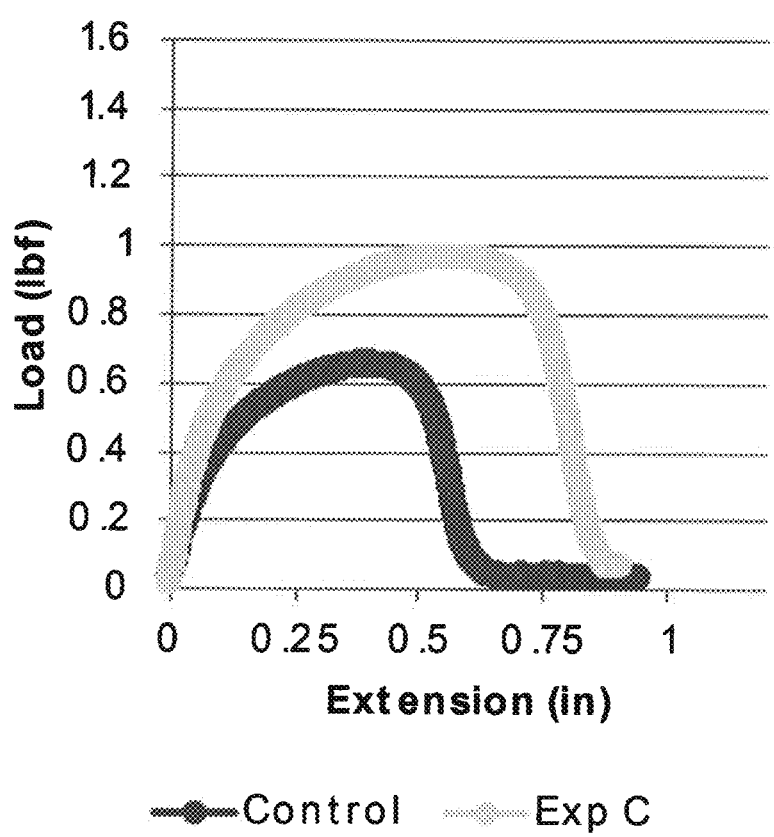
Figure 1 Tensile Properties of Inventive Formulation "C" and Respective Control

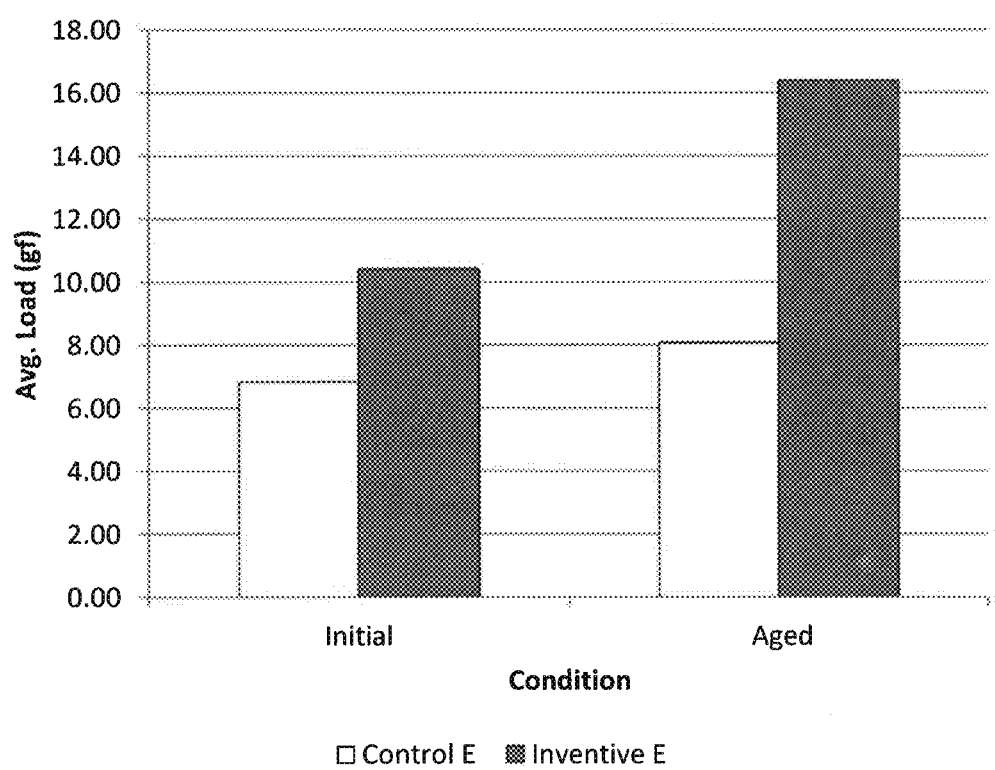
Figure 2. Peel Adhesion of Inventive Formulation "E" and Respective Control

METHODS FOR MAKING A PLASTICIZED POLYMER, METHODS FOR MAKING A COMPOSITION USING THE PLASTICIZED POLYMER, AND COMPOSITIONS COMPRISING THE PLASTICIZED POLYMER

CROSS-REFERENCE TO RELATED APPLICATION

This application claims the benefit under 35 U.S.C. § 119(e) of U.S. Patent Application No. 62/737,954, filed Sep. 28, 2018.

FIELD OF THE INVENTION

This invention relates to methods for making plasticized polymers, especially polyolefins, using a plasticizer suitable for use in a final product, such as a hot melt adhesive.

BACKGROUND OF THE INVENTION

Many patents describe producing or using plasticized polyolefins. No prior art is known which describes performing polymerizations in a plasticizer, such as mineral oil, to generate plasticized materials for end-use applications, such as hot melt adhesives. As used herein, the term "plasticizer" means any substance added to a synthetic resin to produce or promote plasticity and flexibility and to reduce brittleness and is useful in a final formulation for a desired application, such as in an adhesive formulation used in the nonwovens industry. Thus, for purposes herein, a solvent which is conventionally used to make polymers but must be removed (or substantially removed) after polymerization and before the polymer is formulated into an adhesive formulation would not meet the definition of plasticizer as used herein. The differences between a solvent and a plasticizer are well-known. Preferably, plasticizers as used herein have only an appreciable vapor pressure (e.g. below 1 mm Hg at room temperature). Viewed another way, solvents as used herein are compounds having molecular weights below 150 g/mol, and more preferably below 1.25 g/mol.

Materials such as low density/low crystallinity/low molecular weight polyolefin materials could be particularly well suited for the adhesive and sealant industry; however, their intrinsic properties make it difficult to produce. In particular, the materials are likely to foul reactors, can be difficult to pelletize, and often can exhibit cold flow properties that offer challenges in long-term storage and transfer for end-use application. Currently-used processes require the use of expensive equipment to strip and recycle solvent carriers used during traditional polymerization processes. These steps often require significant energy and water usage.

SUMMARY OF THE INVENTION

Embodiments of the present invention avoid many of the issues and constraints of the prior art. In an embedment of the invention, a method for making a plasticized polymer comprises the step of polymerizing a polymerizable monomer in a plasticizer and in the presence of a catalyst system for a time and temperature sufficient to form the plasticized polymer. As the plasticizer is a substance that can be used in a final formulation, the method of the invention can be viewed as an in-situ polymerization of monomers. As such, the invention eliminates the step of removing solvent after polymerization, making the invention more environmentally- and commercially-friendly, reducing water and energy consumption. The invention also allows for a broader range of polymers, including those that cannot be easily pelletized or extruded, to be incorporated into formulations, such as adhesive and sealant formulations. Such polymers Which cannot be easily pelletized or extruded include those having low density or low molecular weight or combinations thereof. Embodiments of the invention are directed to the successful polymerization of polyolefins in mineral oil and the further incorporation of the material into adhesive-type formulations.

According to another embodiment of the invention, a method for making an adhesive comprising the steps of: polymerizing a polymerizable monomer in a plasticizer and in the presence of a catalyst system for a time and temperature sufficient to form the plasticized polymer; and mixing a tackifying resin with the plasticized polymer to produce the adhesive.

According to another embodiment of the invention, a composition comprises:
(a) a polymer system comprising a first polymer;
(b) a plasticized system comprising a first plasticizer that was used in the polymerization step to make the first polymer;
(c) a tackifier;
(d) optionally, a stabilizer or antioxidant; and
(e) optionally, further additives.

Other features and advantages of the invention may be apparent to those skilled in the art upon reviewing the following drawings and description thereof.

BRIEF DESCRIPTION OF THE DRAWING

FIG. 1 shows the tensile properties of an adhesive formulation of the present invention compared to an example not using the inventive plasticized polymer of the present invention.

FIG. 2 shows the peel adhesion of an adhesive formulation of the present invention compared to an example not using the inventive plasticized polymer of the present invention.

DETAILED DESCRIPTION OF THE INVENTION

As mentioned above, it would be desirable to reduce the process steps in making and using polymers. Polymers are most often made in solvents in liquid form, requiring the separation of the polymers from the solvent before the polymers are used in a final formulation. Often, the polymers must be formed as solids, such as by being pelletized or extruded. The present invention carries out the polymerization of polymers in a plasticizer which is suitable for use in a final composition. Such a plasticizer could be mineral oil, for example, which is used in many hot melt adhesive compositions. By carrying out the polymerization step in such a plasticizer, the steps of separating the polymer from the solvent and solidifying the polymer are avoided or are made less burdensome. Furthermore, embodiments of the present invention permit the use of polymers in final compositions that have traditionally been difficult to solidify without fouling equipment or causing other problems. Such polymers include low molecular weight and/or low density polymers.

According to an embodiment of the invention, a method for making a plasticized polymer comprises the step of polymerizing a polymerizable monomer in a plasticizer and in the presence of a catalyst system for a time and temperature sufficient to form the plasticized polymer. A plasticizer, as used herein, means any substance added to a synthetic resin to produce or promote plasticity and flexibility and to reduce brittleness and is useful in a final formulation for the desired application. For example, mineral oil is one such plasticizer as used herein for an adhesive formulation as the final formulation. Such adhesive formulations could be used in a wide range of applications, such as for tape and label applications, beverage labels for glass or plastic bottles, flooring or wall adhesives, or in the nonwovens industry. Other plasticizers include hydrocarbon oils and synthetic oils and others described below and could be used in final formulations as sealants, coatings, or lubricants.

A polymerizable monomer may include a wide range of monomers, but preferably is one or more unsaturated monomers. Such unsaturated monomers may include a wide range of monomers, such as alkenes, (meth)acrylates, or malonates, but preferably are alkenes, such as ethene, propene, butene, or octene, among others. The polymerizable monomer may consist of a single type of monomer, whereby a homopolymer is formed by the polymerization step, such as polyethylene or polypropylene, among others. The polymerizable monomer may alternatively consist of two or more types of monomers, whereby a copolymer is formed by the polymerization step (or terpolymer in the event of three types of monomers, etc.). In one embodiment, the invention uses two types of monomers, ethene and 1-octene, to form a polyethylene copolymer with octene units.

The polymerizing step can be any known polymerization process, such as chain reaction polymerization, using conventional catalysts and conditions which are known in the art. For example, the catalyst system may be contain a Ziegler-Natta catalyst, a metallocene catalyst, or a late transition metal catalyst. Selection of the time, temperature, and other conditions are well-known, based on the desired polymer product including its molecular weight, desired reaction rate, and system used. As is known in the art, the catalyst system may include a catalyst, a support (such as silica gel or zeolite), and a co-catalyst. In an embodiment of the invention, the amount of monomer added is sufficient to provide an amount of polymer in the plasticized polymer of from about 2 wt % (based on the total weight of the system) to an amount just below the solubilization limit of the plasticized polymer at 230° C. (The temperature of 230° C. is a temperature at which many hot melt index measurements are taken for polypropylene.) The solubilization limit is that amount of polymer above which the polymer can no longer be solubilized in the plasticizer at the specified temperature. In an embodiment, the amount of monomer added is sufficient to provide an amount of polymer in the plasticized polymer of from about 2 wt % to about 60 wt %, preferably between about 10 wt % to about 55 wt %, most preferably between about 15 wt % to about 50 wt %. The reaction medium could consist entirely of the plasticizer (and thus contain no measurable amount of solvent or no solvent), or it could include some amount of solvent, such as toluene. The reaction medium preferably contains less than 10 wt % solvent (based on the total weight of the plasticizer and solvent), more preferably contains less than 5 wt % solvent, more preferably contains less than 2 wt % solvent, still more preferably less than 1 wt % solvent, and even still more preferably contains less than 0.5 wt % solvent.

The method of the embodiment of the invention discussed herein produces a plasticized polymer, which can subsequently be used as a component in a final formulation, such as an adhesive. The term "plasticized polymer" is also referred to herein as a "plasticized system." The plasticized polymer may contain a polymer along with unreacted monomer and the plasticizer, along with the catalyst system. The amount of polymer may vary over a wide range, as discussed above, Preferably, the type of polymer produced is one that is difficult to extrude or pelletize, such as low molecular weight and/or low density polymers.

According to an embodiment of the invention, the polymerizing step is a batch process. Alternatively, it could be a continuous or semi-batch process. In general, the process steps in one embodiment, which is a semi-batch process, include first removing polar contaminants from a packed bed of molecular sieves and copper oxide. The plasticizer (e.g., mineral oil), the monomer(s) (e.g., octene and ethene), and any solvent are then purified and any air-sensitive compounds are handled under inert atmosphere. A temperature-controlled autoclave reactor is used. The reactor may be pre-heated and then purged of oxygen. If any solvent is used, that may be added first along with a co-catalyst or scavenger. After the plasticizer, catalyst, and monomers are added, the reaction temperature is kept constant, and the reactor contents are blown out under nitrogen pressure.

As mentioned above, preferably, the type of polymer produced is one that is difficult to extrude or pelletize, such as low molecular weight and/or low density polymers, although the method may be used to produce any polymer, even those which can be extruded or pelletized easily. Preferably, the polymer has a density below 0.94 g/ml, preferably below 0.92 g/ml more preferably below 0.91 g/ml, and most preferable 0.90 g/ml, and preferably a density above 0.75, more preferably above 0.8 g/ml. Alternatively or in addition to the low density, the molecular weight of the polymer is between about 5,000 to about 200,000 g/mol, preferably about 7,500 g/mol to about 150,000 g/mol, more preferably about 10,000 g/mol to about 100,000 g/mol, and most preferred about 10,000 g/mol to about 80,000 g/mol.

Preferably, the final formulation comprises, as its main polymer constituent, a polymer made by embodiments of the present invention. Preferably, the main polymer constituent consists solely of polymer(s) made by embodiments of the present invention. Alternatively, polymer(s) made by embodiments of the present invention could make up some amount (e.g., anywhere from 1-100 wt %, preferably from 10-98 wt %, and most preferably more than 50 wt % of the main polymer constituent. Preferably, the polymer made by methods of the present invention is "polyolefin-based." As such, the final formulation uses a polyolefin as its main polymer constituent or at least some polyolefin made by methods described herein serves as some percentage of the main polymer constituent. The main polymer constituent of a final formulation is the constituent which is the polymer present in the greatest amount of any other polymer. For example, in an adhesive, the main polymer constituent is the polymer component which serves as the cohesive component, as opposed to the resin, plasticizer, antioxidant/stabilizer, or other additives of an adhesive, A polyolefin-based polymer is a polymer which is obtained from unsaturated olefins as monomers. Such olefins are typically ethylene, propylene, butylene, and octene, or some combinations thereof. Polyolefin-based adhesives may include homopolymers or copolymers of polyolefins and mixtures thereof. Furthermore, they include functionalized polyolefins (ethylene or propylene copolymers with oxygen containing monomers). Preferably, in the embodiment in which the final formulation is an adhesive, the adhesive does not contain other types of polymers (other than polyolefins) as its polymer component, such as styrene block copolymers, or has such other types in an amount less than 40% (all by weight), more preferably less than 20%, more preferably less than 5%, more preferably less than 1%, and even more preferably less than 0.1%. However, in embodiments, the adhesive many contain other such polymers or may contain other polyolefins made by convention methods (i.e., not in the presence of a plasticizer).

One polymer blend contains polymers suitable for being made by methods of the invention is described in U.S. Pat. No. 10,011,744, incorporated herein by reference. Such a polymer blend containing at least one semicrystalline LMW SSC-PP polymer and at least one essentially amorphous HMW SSC-PP copolymer; both of which are either homopolypropylene or copolymers of propylene with an α-olefin comonomer prepared by using SSC catalysts; the weight ratio of the LAM SSC-PP polymer to the HMW SSC-PP polymer in the blends ranges from 9:1 to 1:9 and the total amount of the polymer blend in the composition of the present invention is from about 20% to about 80% by weight. Another polymer blend which uses polymers suitable for use in the present invention is described in U.S. Patent Application No. 62/624,369, incorporated herein by reference. Polymers disclosed in the following patents and applications may also be made according to methods of the present invention: U.S. Patent Application Publication No. 2016/0177142, incorporated herein by reference; U.S. Pat. No. 9,670,388, incorporated herein by reference; U.S. Patent Application Publication No. 2016/0121014, incorporated herein by reference, in which the second polymer described therein is a propylene-based polymer; U.S. Pat. No. 8,188,200, incorporated herein by reference; U.S. Patent Application Publication No. 2007/0203310, incorporated herein by reference; and U.S. Patent Application Publication No. 2002/0045536, incorporated herein by reference.

According to another embodiment of the invention, a method for making a final formulation (such as an adhesive including a hot melt adhesive, a sealant, a coating, or a lubricant) comprising the steps of polymerizing a polymerizable monomer in a plasticizer and in the presence of a catalyst system for a time and temperature sufficient to form the plasticized polymer; and mixing at least one constituent with the plasticized polymer to produce the final formulation, for example, the tackifier to produce an adhesive. In the case of making adhesives, a tackifier, a stabilizer, or an antioxidant may be added, optionally, and other optional additives may also be included.

A suitable plasticizer may be selected from the group which includes the usual plasticizing oils, such as mineral oil, but also olefin oligomers and low molecular weight polymers. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. The oligmers may be polypropylenes, polybutenes, hydrogenated polyisoprenes, hydrogenated polybutadiens, or the like having average molecular weight between about 350 g/mole and about 10,000 g/mole. Other useful plasticizers can be found in the families of conventional dibenzoate, phosphate, phthalate esters, as well as esters of mono- or polyglycols, Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that find usefulness in the present invention can be any number of different plasticizers but the inventors have discovered that mineral oil and liquid polybutenes having average molecular weight less than 5,000 are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive.

The hot melt adhesive composition of the present invention may include a tackifying resin (also referred to herein as a "tackifier") having a Ring & Ball softening point of below about 150° C. The range of the softening point of the resin is bread and could be as low as 5° C. for liquid resins and 60° C. for solid resins. As defined in the present description, the tackifier can be a molecule or a macromolecule and generally is a chemical compound or a fairly low molecular weight polymer, compared to common polymers, from a natural source or from a chemical process or combination thereof that in general enhances the adhesion of a final hot melt adhesive composition, Representative resins include the C5/C9 hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of tereperie hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acylic C5 resins and aromatic modified acyclic or cyclic resins.

In an embodiment of the invention, the tackifier is selected from the group consisting of aliphatic and cycloaliphatic hydrocarbon resins and their hydrogenated derivatives, hydrogenated aromatic hydrocarbon resins, aromatically modified aliphatic or cycloaliphatic resins and their hydrogenated derivatives, polyterpene and styrenated polyterpene resins and mixtures thereof. In another embodiment of the invention, the tackifier is selected from the group consisting of a C-5 aliphatic hydrocarbon resin, a hydrogenated C-5 resin, a hydrogenated C-9 resin, a hydrogenated DCPD resin and an aromatic-modified DCPD resin.

In an embodiment of the invention, the tackifying resin has a Ring and Ball softening point (measured by ASTM E28) of at least about 40° C., most preferably between about 80° C. and 115° C. Even more preferably, the tackifier used herein has a Ring & Ball softening point of less than 110° C. and most preferably less than 105° C.

An embodiment of the present invention provides a hot melt adhesive composition comprising a tackifying resin in an amount of from about 25% to about 75%. Preferably, the tackifying resin is present in an amount of between about 30% and about 70%, more preferably between about 35% and about 65%, and most preferably between about 40% and about 60%, by weight.

The hot melt adhesive of the present invention may also include a stabilizer and/or an antioxidant in an effective amount, preferably in an amount of from about 0.1% to about 5% by weight. Preferably from about 0.1% to 2% of a stabilizer or antioxidant is incorporated into the composition. The stabilizers which are useful in the hot melt adhesive compositions of the present invention are incorporated to help protect the polymers noted above, and thereby the total adhesive system, from the effects of thermal and oxidative degradation which normally occur during the manufacture and application of the adhesive as well as in the ordinary exposure of the final product to the ambient environment. Among the applicable stabilizers are hindered phenols and multifunction phenols, such as sulfur and phosphorous-containing phenols. Antioxidants, such as hindered amine phenols, may be characterized as phenolic compounds that also contain bulky radicals in close proximity to the phenolic hydroxyl group thereof and are preferred. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus provides the phenolic compound with its stabilizing properties.

Polyolefin nucleating agents may also be also present in the adhesive of the invention. Nucleating agents suitable for this invention are generally of the sub class of nucleating agents known as clarifying agents that are commonly employed in polyolefin additive packages to promote rapid crystallization. Suitable materials include dibenzylidene sorbitol derivatives such as Millad 3988 and Millad NX8000 supplied by Milliken as well as Irgaclear D produced by BASF. Other suitable agents include aromatic amide systems such as NJ Star NU-100 provided by New Japan Chemical Company. If included, the nucleating agent is generally present in the adhesive compositions in amounts of about 0.05 to 5% by weight of the composition, preferably about 0.1 to 2.5% by weight are utilized, and most preferably about 0.2 to 1.0% by weight. Blends of two or more nucleating agent may also be used. For example, a blend of a nucleating agent and a second nucleating agent that is different than the first nucleating agent may also be employed. From about 0.05% to about 5% by weight of one or more additional nucleating agent may be blended together with the first nucleating agent if desired. The nucleating agent may be used directly as a powder, as a slurry in a portion of suitable plasticizing agent, or as a component in a masterbatch of suitable polymer masterbatch such as Milliken NX-10. Nucleation packages such as those described in US 2015/0299526 can also be included to tailor the set up rate and bonding properties of the hot-melt adhesive.

It should be understood that other optional additives may be incorporated into the adhesive composition of the present invention in order to modify particular physical properties. These may include, for example, such materials as ultraviolet light (UV) absorbers, waxes, surfactants, inert colorants, titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour and may be included in an amount up to 60% by weight, and preferably between 1 and 50% by weight.

In an embodiment of the invention, the hot melt adhesive composition does not include a wax. In embodiments of the invention in which wax is included, waxes may be included in the amount up to 20% by weight, preferably between 0.1% and 18% by weight. The wax may be selected from the group consisting of petroleum waxes, low molecular weight polyethylene and polypropylene, synthetic waxes and polyolefin waxes and mixtures thereof. In preferred embodiments, the wax is a low molecular weight polyethylene having a number average molecular weight of about 400 to about 6,000 g/mol.

The viscosity of the adhesive material according to the present invention should be generally at a viscosity at the application temperature appropriate to be processed and applied to its substrate. An adhesive with relatively low viscosity at a low application temperature is needed to be processed through standard hot melt adhesive equipment and to achieve the desired pattern and consequently suitable bonding performance at the application temperature. In general, the viscosity is equal to or less than about 35,000 cP at 121° C., preferably equal to or less than about 30,000 cP at 121° C., even more preferably less than about 25,000 cP at 121° C., still more preferably less than about 20,000 cP at 121° C. according to ASTM D3236, All viscosities identified herein are measured according to this modified ASTM standard. Preferably, the viscosity of the composition is at least 1,000 cP, more preferably at least 5,000 cP, still more preferably at least about 7,500 cP and most preferably at least about 15,000 cP, at 121° C. When several lower limits and upper limits of a value of a property are listed herein, the invention includes ranges between and including any of the lower limits to any of the upper limits. Thus the viscosity could be between 1,000 cP and 35,000 cP and between 5,000 cP and 20,000 cP at 121° C. In other embodiments, the viscosity of the composition is between any of the ranges contemplated herein at various typically used application temperatures between 121° C. at 149° C., such as at 121° C., 127° C., 135° C., and 149° C.

In an embodiment of the invention, additives, such as any of those described above, are mixed with the plasticized polymer to form a final formulation. For example, a tackifier, stabilizer, and an antioxidant may be mixed with the plasticized polymer to form an adhesive. In some embodiments, it may be desirable to add a second polymer component to the plasticized polymer, such as when a bimodal polymeric effect is desired. In still another embodiment of the invention, additional plasticizer is mixed with the plasticized polymer, wherein the additional plasticizer is the same as or different from the plasticizer of the plasticized polymer. A further embodiment comprises transporting the plasticized polymer between the polymerizing step and the mixing of additional ingredients with the plasticized polymer, for example in cases where it is desirable to make an adhesive formulation at the site of its use shortly before application.

If an additional polymer is added to the plasticized polymer, the added polymer may also be in liquid or dispersed form. In one embodiment, the added polymer is in solid form and is mixed with the plasticized polymer. For example, a method according to an embodiment of the invention may include a second polymerizing step different from the primary polymerizing step to provide a second plasticized polymer and mixing the second plasticized polymer with the first plasticized polymer to form a bi-modal polymer blend. The second polymerizing step may be different from the first polymerizing step in at least one of the following ways: (1) the second polymerization step uses a second monomer different from the monomer used in the first polymerization step; (2) the second polymerization step uses an amount of monomer different from the amount of monomer used in the first polymerization step or, in the case of more than one monomer, different relative amounts; and (3) the second polymerization step uses a second set of conditions to provide a plasticized polymer having at least one of a different molecular weight or a different density. On the other hand, the additional polymer may be made by traditional methods, such as with a solvent then extruded or pelletized.

Preferably, the method of the present invention comprises degassing the plasticized polymer to flash off some, or preferably substantially all, unreacted monomer before the mixing step. In another embodiment of the present invention, the polymerizing and mixing steps are carried out without any intervening solvent removal step. In still another embodiment of the present invention, the polymerizing and mixing steps are carried out without any intervening pelletizing or extruding steps.

According to still another embodiment of the invention, a composition comprises:
(a) a polymer system comprising a first polymer;
(b) a plasticizer system comprising a first plasticizer that was used in the polymerization step to make the first polymer (in other words, the first plasticizer was in the presence of the first polymer during the polymerization step);
(c) a tackifier;
(d) optionally, a stabilizer or antioxidant; and
(e) optionally further additives.

As mentioned above, the first plasticizer was in the presence of the first polymer during the polymerization step to make the first polymer. Thus, the invention can be said to use an in situ polymerization step. There might have been a small amount of other solvent present during the polymerization step and some solvent may be present in the final adhesive formulation. The reaction medium could consist entirely of the plasticizer (and thus contain no measurable amount of solvent or no solvent), or it could include some amount of solvent, such as toluene. The reaction medium preferably contains less than 10 wt % solvent (based on the total weight of the plasticizer and solvent), more preferably contains less than 5 wt % solvent, more preferably contains less than 2 wt % solvent, still more preferably less than 1 wt % solvent, and even still more preferably contains less than 0.5 wt % solvent. In the final formulation, the plasticizer system preferably comprises a first plasticizer in an amount greater than 90 wt %, preferably greater 95 wt %, more preferably greater than 98 wt %, still more preferably greater than 99 wt % solvent, and even still more preferably greater than 99.5 wt % solvent based on any other constituents (other than the monomer reactants and polymer products) that were present as reaction medium during the polymerization step. Most preferably, the plasticizer system is all or substantially all of the first plasticizer relative to on any other constituents (other than the monomer reactants and polymer products) that were present as reaction medium during the polymerization step. Preferably, the first polymer preferably has a density below 0.94 g/ml, preferably below 0.92 g/ml, more preferably below 0.91 and most preferable 0.90 g/ml and preferably a density above 0.75, more preferably above 0.8 g/ml. Preferably, the number average molecular weight of the first polymer is less than. 200,000 g/mol, preferably less than 150,000 g/mol, more preferably less than 100,000 g/mol, and most preferably less than 80,000 g/mol. In embodiments, the first polymer has either of these characteristics or both. In another embodiment of the invention, the polymer system further comprises a second polymer.

According to another embodiment of the invention, the composition comprises:
(a) about 10 to about 40 wt % of the polymer system, preferably about 15 to about 35 wt % and more preferably about 20 to about 30 wt %;
(b) about 10 to about 40 wt % of the plasticizer system, preferably about 15 to about 35 wt % and more preferably about 20 to about 30 wt %; and
(c) about 30 to about 70 wt % a tackifier, preferably about 35 to about 65 wt % and more preferably about 40 to about 60 wt %.

In still another embodiment of the invention, the plasticizer system comprises at least about 25 wt % of the first plasticizer, preferably at least about 50 wt % of the first plasticizer, more preferably at least about 75 wt % of the first plasticizer, and most preferably at least about 90 wt % of the first plasticizer. In still another embodiment, the composition is one of a hot melt adhesive, a sealant, a coating, or a lubricant.

The hot melt adhesive may be applied to the substrate(s) using a variety of coating techniques. Examples include hot melt slot die coating, hot melt wheel coating, hot melt roller coating, melt-blown coating as well as slot, spiral spray, and wrapping spray methods such as those used to affix elastic strands. Spray techniques are numerous and can be done with or without assistance of compressed air that would shape the adhesive spray pattern. The hot melt adhesive material is generally pumped molten through hoses to the final coating spot on the substrates.

Aspects of the Invention

Aspect 1. A method for making a plasticized polymer comprising the step of polymerizing a polymerizable monomer in a plasticizer and in the presence of a catalyst system for a time and temperature sufficient to form the plasticized polymer.

Aspect 2. The method of Aspect 1, wherein the polymerizing step is a batch process.

Aspect 3. The method of Aspect 1, wherein the polymerizing step is a continuous process.

Aspect 4. The method of any of Aspects 1-3, wherein the molecular weight of the polymer is between about 5,000 to about 200,000 g/mol, preferably between about 7,500 g/mol to about 150,000 g/mol, more preferably between about 10,000 g/mol to about 100,000 g/mol, and most preferably between about 10,000 g/mol to about 80,000 g/mol.

Aspect 5. The method of any of Aspects 1-4, wherein the amount of monomer added is sufficient to provide an amount of polymer in the plasticized polymer of from about 2 wt % to an amount just below the solubilization limit of the plasticized polymer at 230° C.

Aspect 6. The method of any of Aspects 1-5, wherein the monomer comprises an unsaturated monomer, preferably an alkene.

Aspect 7. A method for making an adhesive comprising the steps of: polymerizing a polymerizable monomer in a plasticizer and in the presence of a catalyst system for a time and temperature sufficient to form the plasticized polymer; and mixing a tackifying resin with the plasticized polymer to produce the adhesive.

Aspect 8. The method of Aspect 7 further comprising mixing additives with the plasticized polymer.

Aspect 9. The method of Aspects 7 or 8 further comprising mixing a polymer in sold form polymer with the plasticized polymer.

Aspect 10, The method of any of Aspects 7-9, further comprising a second polymerizing step different from the polymerizing step to provide a second plasticized polymer and the mixing step comprises mixing the second plasticized polymer with the first plasticized polymer to form a bi-modal polymer blend.

Aspect 11. The method of any of Aspects 7-10 further comprising mixing additional plasticizer with the plasticized polymer, wherein the additional plasticizer is the same as or different from the plasticizer of the plasticized polymer.

Aspect 12. The method of any of Aspects 741 further comprising transporting the plasticized polymer between the polymerizing and mixing steps.

Aspect 13. The method of any of Aspects 7-12, wherein the polymerizing and mixing steps are carried out without any intervening solvent removal step.

Aspect 14. The method of any of Aspects 7-13, wherein the polymerizing and mixing steps are carried out without any intervening pelletizing or extruding steps.

Aspect 15. A composition comprising:
(a) a polymer system comprising a first polymer;
(b) a plasticized system comprising a first plasticizer that was in the used in the polymerization step to make the first polymer; and
(c) a tackifier.

Aspect 16. The composition of Aspect 15 further comprising at least one of a stabilizer and an antioxidant.

Aspect 17. The composition of Aspects 15 or 16, wherein the first polymer has a density below 0.94 g/ml, preferably below 0.92 g/ml, more preferably below 0.91 g/ml, and most preferable 0.90 g/ml.

Aspect 18. The composition of any of Aspects 15-17, wherein the number average molecular weight of the first polymer is less than 200,000 g/mol, preferably less than 150,000 g/mol, more preferably less than 100,000 g/mol, and most preferably less than 80,000 g/mol, Aspect 19. The composition of any of Aspects 15-18, wherein the polymer system further comprises a second polymer.

Aspect 20. The composition of any of Aspects 15-19, comprising:
(a) between about 10 to about 40 wt % of the polymer system, preferably between about 15 to about 35 wt % and more preferably between about 20 to about 30 wt %;
(b) between about 10 to about 40 wt % of the plasticizer system, preferably between about 15 to about 35 wt % and more preferably between about 20 to about 30 wt %; and
(c) between about 30 to about 70 wt % a tackifier, preferably between about 35 to about 65 wt % and more preferably between about 40 to about 60 wt %.

Aspect 21. The composition of any of Aspects 15-20, wherein the plasticizer system comprises at least about 25 wt % of the first plasticizer, preferably at least about 50 wt % of the first plasticizer, more preferably at least about 75 wt % of the first plasticizer, and most preferably at least about 90 wt % of the first plasticizer.

Aspect 22. The composition of any of Aspects 15-21, wherein the composition is one of an adhesive, a sealant, a coating, or a lubricant.

EXAMPLES

The following examples demonstrate several aspects of certain preferred embodiments of the present invention, and are not to be construed as limitations thereof.

The feasibility of ethylene homopolymerization and copolymerization with 1-octene in mineral oil was investigated in a semi-batch solution reactor using CGC-Ti catalyst. Methylaluminoxane (MAO) was used as a cocatalyst and as an impurity scavenger.

Ethylene and nitrogen (Praxair) were flown through beds packed with molecular sieves (a mixture of 4-A° and 133 sieves) and copper(II) oxide to remove polar contaminants. The mineral oil, Kaydol White USP from Sonneborn, Inc., has a molecular weight of 430 g/mol, parrafinic C % of 57, and a specific gravity at 25° C. of between 0.869-0.885, was purified by flowing it over a column filled with molecular sieve 5-A°. 1-Octene (Sigma-Aldrich) was purified in a similar way. HPLC grade toluene (Aldrich) was purified by refluxing it over metallic sodium for 40 hours and then by distilling it under nitrogen atmosphere. CGC-Ti (Boulder Scientific) was purchased as a solid and dissolved in distilled toluene for polymerization. All air-sensitive compounds were handled under inert atmosphere in a glove box.

All polymerizations were done in a 500-ml Parr autoclave reactor operated in semi-batch mode. The polymerization temperature was controlled using an electrical band heater and an internal cooling coil. The reaction medium was mixed using a pitched-blade impeller connected to a magneto-driver stirrer, rotating at 1,000 rpm. Prior to use, the reactor was heated to 125° C., evacuated and refilled with nitrogen six times to reduce the oxygen concentration in the reactor, and finally charged with 200 ml of toluene and 1 g of MAO as a scavenger. The reactor temperature was then increased to 120° C. and kept constant for 20 minutes. Finally, the reactor contents were blown out under nitrogen pressure. This procedure ensures excellent removal of impurities from the reactor walls.

In a typical polymerization run, 173 g of mineral oil was charged into the reactor, followed by an appropriate amount of MAO, introduced via a 10-ml vial at room temperature. The temperature was then increased to 120° C. and ethylene was supplied to saturate the mineral oil to the desired pressure. The catalyst solution was injected via a 5-ml tube and a 20-ml sampling cylinder connected in series, with an ethylene pressure differential of 40 prig. A volume of 3 ml of toluene was placed in the sampling cylinder before injection to wash the tube wall from any remaining catalyst solution. Ethylene was supplied on demand to maintain a constant reactor pressure and monitored with a mass flow meter. With the exception of a 1-3° C. fluctuation in temperature upon catalyst injection for some runs, the temperature was kept at 120° C.±0.5° C. throughout the polymerizations. After the required amount of time, the polymerization was stopped by closing the monomer feed valve and immediately blowing out the reactor contents into a 2-L beaker.

Molecular weight distributions (MWD) were determined with a Polymer Char high-temperature gel permeation chromatographer (GPC), run at 145° C. under a flow rate of 1,2,4-trichlorobenzene (TCB) of 1 mL/min. The GPC was equipped with three detectors in series (infra-red, light scattering and differential viscometer) and calibrated with polystyrene narrow standards. The IR-4 detector was used to estimate commoner content across the MWD.

The polymer yield was estimated based on the ethylene consumed during reaction, 1-octene content of the polymer, and initial weight of the oil in the reactor Eight polymerizations were performed at different levels of 1-octene concentrations in the liquid phase fed into the reactor. The total reactor pressure was kept constant at the values of 120 psig for all the runs. Polymerization conditions are summarized in Table 1.

TABLE 1

Polymerization conditions for copolymerization of ethylene with 1-octene in mineral oil.

| Run | 1-Octene in liquid feed (mol/L) | Polymerization Temperature ° C. |
|---|---|---|
| A | 0.000 | 125 |
| B | 0.000 | 120 |
| C | 0.00038 | 120 |
| D | 0.0006 | 120 |
| E | 0.00043 | 120 |
| F | 0.00018 | 120 |
| G | 0.00009 | 120 |
| H* | 0.00034 | 120 |

[Al/Ti] = 1450,
P = 120 psig,
$t_p$ = 12 min,
mineral oil volume = 200 ml.

*For this run an increase in temperature of about 7° C. was observed for about 1.4 min during initial stage of polymerization Table 2 summarizes molecular weight averages, polymer content and wt % of 1-octene incorporated for the samples reported in Table 1, as well as the polydispersity index and yield. The polydispersity indices for all samples are higher than the expected theoretical value of 2.0, perhaps indicating that mass transfer effects (likely due to the high viscosity of the polymerization medium) play a role during polymerization. On the other hand, as will be discussed below, comonomer incorporation across the MWD follows the expectations for copolymers made with single-site catalysts.

Samples A and B are both homopolymers, but the molecular weight for the sample A is lower due to the higher reaction temperature used during the polymerization A.

TABLE 2

Molecular weight averages and wt % of 1-octene incorporated for the runs in Table 1

| Run | $M_w$ | $M_n$ | PDI | wt % of 1-octene in polymer | Solid content (polymer yield) |
|---|---|---|---|---|---|
| A | 104000 | 40000 | 2.4 | 0 | 4.6 |
| B | 146000 | 52000 | 2.82 | 0 | 4.8 |
| C | 93000 | 30000 | 3.17 | 38.4 | 7.7 |
| D | 72000 | 29000 | 2.5 | 46.5 | 13.6 |
| E | 119700 | 42700 | 2.8 | 35.3 | 10.1 |
| F | 145000 | 55000 | 2.63 | 18.4 | 7.8 |
| G | 105000 | 38000 | 2.7 | 3.2 | 5.9 |
| H | 71000 | 29500 | 2.4 | 41.5 | 6.5 |

This data shows that ethylene/1-octene copolymers can be made using mineral oils as the polymerization medium. The polymers are produced at reasonable yields with microstructures expected for single-site copolymers, albeit with MWDs that are somewhat broader than expected, likely due to mass transfer limitation caused by the high viscosity of the reaction medium. Most notably, no significant decreases in reaction rate or temperature control were seen in mineral oil compared to more standard solvents such as toluene. Both ethylene homopolymers and ethylene/1-octene copolymers were successful prepared and characterized in paraffinic-based oil. The final solutions contained approximately 5-15 weight percent polymer. Surprisingly, comonomer incorporation up to 46 weight percent could be made in ethylene copolymers with 1-octene.

Several adhesive formulations were prepared both incorporating the inventive polymer/oil package and a traditional blend of mineral oil with ethylene/octene copolymers that were produced using commercial technology that resulted in pellets. The adhesive formulations are shown below in Table 3

TABLE 3

Example Adhesive Formulations and Their Respective Controls

| | 1C"-Control | 1-C" | 1D"-Control | 1-D" | 1E"-Control | 1-E" |
|---|---|---|---|---|---|---|
| Kaydol USP Oil, wt % | 47.78 | | 43.30 | | 45.95 | |
| Experimental Sample, wt % | | 51.77 | | 50.12 | | 52.11 |
| Irganox 1010, wt % | 0.56 | 0.56 | 0.58 | 0.58 | 0.57 | 0.57 |
| Escorez 5400, wt % | 16.83 | 16.83 | 17.40 | 17.40 | 17.06 | 17.06 |
| Infuse 9807, wt % | 25.23 | 25.23 | 26.10 | 26.10 | 25.58 | 25.58 |
| Affinity GA1900, wt % | 9.59 | 5.61 | 12.62 | 5.80 | 10.85 | 5.69 |
| Exp. Sample Polymer % | | 3.99 | | 6.82 | | 5.16 |

In the above Table, the following constituents were used:

Kaydol oil, a white mineral oil purchased from Sonneborn Inc., Parsippany, N.J.

Irganox 1010, a hindered phenol antioxidant purchased from BASF Corporation, Florham, N.J.

Escorez 5400, purchased from ExxonMobil, a very light color, hydrogenated cycloaliphatic hydrocarbon tackifier having an R&B softening point of about 103° C.

INFUSE 9807 is a high melt index, low density olefin block copolymers, available from The Dow Chemical Company.

Affinity GA 1900, a polyolefin elastomer, available from The Dow Chemical Company.

Also, the percentage in the "Experimental Sample" row is of the plasticized polymer based on the adhesive formulation. The percentage provided in the "Experimental Sample Polymer" row is of the polymer in the plasticized polymer.

Adhesive formulations were then screened for tensile properties and adhesive peel performance. Overall, tensile properties of the inventive adhesive formulations showed desirably higher load and elongation capabilities, as shown in FIG. 1. Multiple formulations were screened for adhesive peel at various conditions (substrates, add-ons, and open time). Most formulations show comparable performance initially and after aging. A few select formulations showed improved performance, as shown in FIG. 2.

Where a range of values is provided, it is understood that each intervening value, and any combination or sub-combination of intervening values, between the upper and lower limit of that range and any other stated or intervening value in that stated range, is encompassed within the range of values recited. In addition, the invention includes a range of a constituent which is the lower limit of a first range and an upper limit of a second range of that constituent.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue or prior invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

We claim:

1. A method for making a plasticized polymer comprising the step of:
polymerizing a polymerizable monomer in a reaction medium comprising a plasticizer and in the presence of a catalyst system for a time and temperature sufficient to form a plasticizer system comprising the plasticized polymer, wherein the plasticizer system further comprises at least 25 wt % of the plasticizer and is suitable for use as a component in an adhesive, wherein:
the plasticizer is selected from the group consisting of mineral oil, liquid polybutene, hydrocarbon oil, synthetic oil, a dibenzoate, a phosphate, a phthalate ester, and an ester of a monoglycol or a polyglycol, and the reaction medium contains less than 10 wt % solvent.

2. The method of claim 1, wherein the polymerizing step is a batch process.

3. The method of claim 1, wherein the polymerizing step is a continuous process.

4. The method of claim 1, wherein the molecular weight of the polymer is between about 5,000 to about 200,000 g/mol.

5. The method of claim 1, wherein the amount of monomer added is sufficient to provide an amount of polymer in the plasticized polymer of from about 2 wt % to an amount just below the solubilization limit of the plasticized polymer at 230° C.

6. The method of claim 1, wherein the monomer comprises an unsaturated monomer.

7. The method of claim 6, wherein the unsaturated monomer comprises an alkene.

8. A method for making an adhesive comprising the steps of:
polymerizing a polymerizable monomer in a reaction medium comprising a plasticizer and in the presence of a catalyst system for a time and temperature sufficient to form a plasticizer system comprising the plasticized polymer, wherein the plasticizer system comprises at least 25 wt % of the plasticizer and the plasticizer system is suitable for use as a component in an adhesive; and
mixing a tackifying resin with the plasticizer system to produce the adhesive, wherein:
the plasticizer is selected from the group consisting of mineral oil, liquid polybutene, hydrocarbon oil, synthetic oil, a dibenzoate, a phosphate, a phthalate ester, and an ester of a monoglycol or a polyglycol, and preferably comprises mineral oil, and the reaction medium contains less than 10 wt % solvent.

9. The method of claim 8 further comprising mixing additives with the plasticizer system.

10. The method of claim 8 further comprising mixing a polymer in sold form with the plasticizer system.

11. The method of claim 8 further comprising a second polymerizing step different from the polymerizing step to provide a second plasticized polymer and the mixing step comprises mixing the second plasticized polymer with the first plasticized polymer to form a bi-modal polymer blend.

12. The method of claim 8 further comprising mixing additional plasticizer with the plasticizer system, wherein the additional plasticizer is the same as or different from the plasticizer of the plasticized polymer.

13. The method of claim 8 further comprising transporting the plasticizer system between the polymerizing and mixing steps.

14. The method of claim 8, Wherein the polymerizing and mixing steps are carried out without any intervening solvent removal step.

15. The method of claim 8, wherein the polymerizing and mixing steps are carried out without any intervening pelletizing or extruding steps.

16. A composition comprising:
(a) a polymer system comprising a first polymer;
(b) a plasticizer system comprising a first plasticizer that was used in the polymerization step to make the first polymer, wherein the plasticizer system comprises at least 25 wt % of the first plasticizer, and the first plasticizer is selected from the group consisting of mineral oil, liquid polybutene, hydrocarbon oil, synthetic oil, a dibenzoate, a phosphate, a phthalate ester, and an ester of a monoglycol or a polyglycol, and preferably comprises mineral oil; and
(c) a tackifier.

17. The composition of claim 16 further comprising at least one of a stabilizer and an antioxidant.

18. The composition of claim 16, wherein the first polymer has a density below 0.94 g/ml.

19. The composition of claim 18, wherein the number average molecular weight of the first polymer is less than 200,000 g/mol.

20. The composition of claim 16, wherein the polymer system further comprises a second polymer.

21. The composition of claim 17, comprising:
(a) between about 10 to about 40 wt % of the polymer system;
(b) between about 10 to about 40 wt % of the plasticizer system; and
(c) between about 30 to about 70 wt % a tackifier.

22. The composition of claim 16, wherein the composition is one of an adhesive, a sealant, a coating, or a lubricant.

23. The method of claim 1, wherein the plasticizer comprises mineral oil.

24. The method of claim 8, wherein the plasticizer comprises mineral oil.

25. The composition of claim 16, wherein the first plasticizer comprises mineral oil.

\* \* \* \* \*